(12) United States Patent
Gourlay

(10) Patent No.: US 12,529,515 B2
(45) Date of Patent: Jan. 20, 2026

(54) THERMAL BEVERAGE SLEEVE

(71) Applicant: Christopher David Gourlay, Woodland Hills, CA (US)

(72) Inventor: Christopher David Gourlay, Woodland Hills, CA (US)

( * ) Notice: Subject to any disclaimer, the term of this patent is extended or adjusted under 35 U.S.C. 154(b) by 0 days.

(21) Appl. No.: 18/782,769

(22) Filed: Jul. 24, 2024

(65) Prior Publication Data
US 2025/0155191 A1    May 15, 2025

Related U.S. Application Data

(60) Provisional application No. 63/598,254, filed on Nov. 13, 2023.

(51) Int. Cl.
*F25D 5/02*        (2006.01)
*F25D 31/00*       (2006.01)
*B65D 81/38*       (2006.01)

(52) U.S. Cl.
CPC .............. *F25D 31/007* (2013.01); *F25D 5/02* (2013.01); *B65D 81/3881* (2013.01)

(58) Field of Classification Search
CPC .... F25D 31/007; F25D 3/08; F25D 2331/809; F25D 2331/805; F25D 2331/803; B65D 81/3881; B65D 81/3876; B65D 81/3879; B65D 81/3886; B65D 81/18; A47J 36/28; A47G 23/02; A47G 23/04; A47G 19/2288; A47G 2023/0275
USPC .......... 220/739, 592.2, 592.16, 592.17; 62/4, 62/457.4
See application file for complete search history.

(56) References Cited

U.S. PATENT DOCUMENTS

| | | | |
|---|---|---|---|
| 3,379,025 A | | 4/1968 | Donnelly |
| 4,751,119 A | | 6/1988 | Yukawa |
| 4,816,048 A | | 3/1989 | Kimmelshue |
| 5,163,504 A | * | 11/1992 | Resnick .................. F25D 5/02 165/47 |
| 5,243,835 A | * | 9/1993 | Padamsee ........... A47J 41/0044 62/530 |
| 6,112,537 A | * | 9/2000 | Broadbent ............. B65D 25/08 62/372 |
| 6,330,808 B1 | * | 12/2001 | Kouwenberg ........ F25D 31/007 62/530 |

(Continued)

*Primary Examiner* — Steven A. Reynolds
(74) *Attorney, Agent, or Firm* — Dunlap Bennett & Ludwig PLLC

(57) ABSTRACT

A thermal beverage sleeve for keeping beverages cold is disclosed. The thermal beverage sleeve comprises a substantially cylindrical main body having open first and second ends with a central opening passing therebetween, and a substantially circular bottom configured to be slidably received and held within the first end. The cylindrical main body comprises an outer layer, a first pouch, a second pouch, and an inner layer. The outer layer forms the exterior surface of the cylindrical main body, the inner layer forms the interior surface and central opening of the cylindrical main body, and the first and second pouches are sandwiched between the outer layer and inner layer. In preferred embodiments, at least one of the first and second pouches contains water, with the other of the first and second pouches containing a chemical compound that undergoes an endothermic chemical reaction when mixed with water.

12 Claims, 4 Drawing Sheets

(56) References Cited

U.S. PATENT DOCUMENTS

| | | | |
|---|---|---|---|
| 6,564,558 B1* | 5/2003 | Seymour | F24V 30/00 |
| | | | 62/4 |
| 6,701,720 B1 | 3/2004 | Stone et al. | |
| 7,089,749 B1* | 8/2006 | Schafer | F25B 21/04 |
| | | | 62/3.2 |
| 8,539,777 B2 | 9/2013 | Henry | |
| 8,826,672 B2* | 9/2014 | Farone | F25D 5/00 |
| | | | 62/4 |
| 9,555,949 B1* | 1/2017 | French | F25D 3/08 |
| 11,375,835 B2* | 7/2022 | Sherburne | A47G 19/2288 |
| 12,151,872 B1* | 11/2024 | Anthony | B65D 17/02 |
| 12,292,234 B1* | 5/2025 | Anthony | F25D 5/02 |
| 2002/0129610 A1 | 9/2002 | Searle | |
| 2005/0279106 A1* | 12/2005 | Leonzo | F24V 30/00 |
| | | | 126/263.08 |
| 2008/0053109 A1* | 3/2008 | Quincy | F25D 31/007 |
| | | | 62/4 |
| 2008/0271476 A1 | 11/2008 | Langguth | |
| 2009/0094994 A1* | 4/2009 | Willcoxen | F25D 3/08 |
| | | | 220/592.16 |
| 2010/0251731 A1 | 10/2010 | Bergida | |
| 2012/0144845 A1* | 6/2012 | Leavitt | F25D 5/02 |
| | | | 62/4 |
| 2012/0198860 A1* | 8/2012 | Joseph | F25D 5/02 |
| | | | 62/4 |
| 2013/0098069 A1* | 4/2013 | Collins | F25D 5/02 |
| | | | 62/4 |
| 2013/0168399 A1 | 7/2013 | Harrison-Griffin | |
| 2013/0221013 A1* | 8/2013 | Kolowich | A61J 9/00 |
| | | | 220/592.17 |
| 2015/0354885 A1* | 12/2015 | Rasmussen | F25D 5/02 |
| | | | 62/4 |
| 2016/0131421 A1* | 5/2016 | Bogaard | F25D 3/08 |
| | | | 62/457.4 |
| 2016/0209112 A1* | 7/2016 | Bayless | F25D 7/00 |
| 2017/0071381 A1* | 3/2017 | Ze | B65D 81/3844 |
| 2017/0363341 A1* | 12/2017 | Nguyen | F25D 3/08 |

* cited by examiner

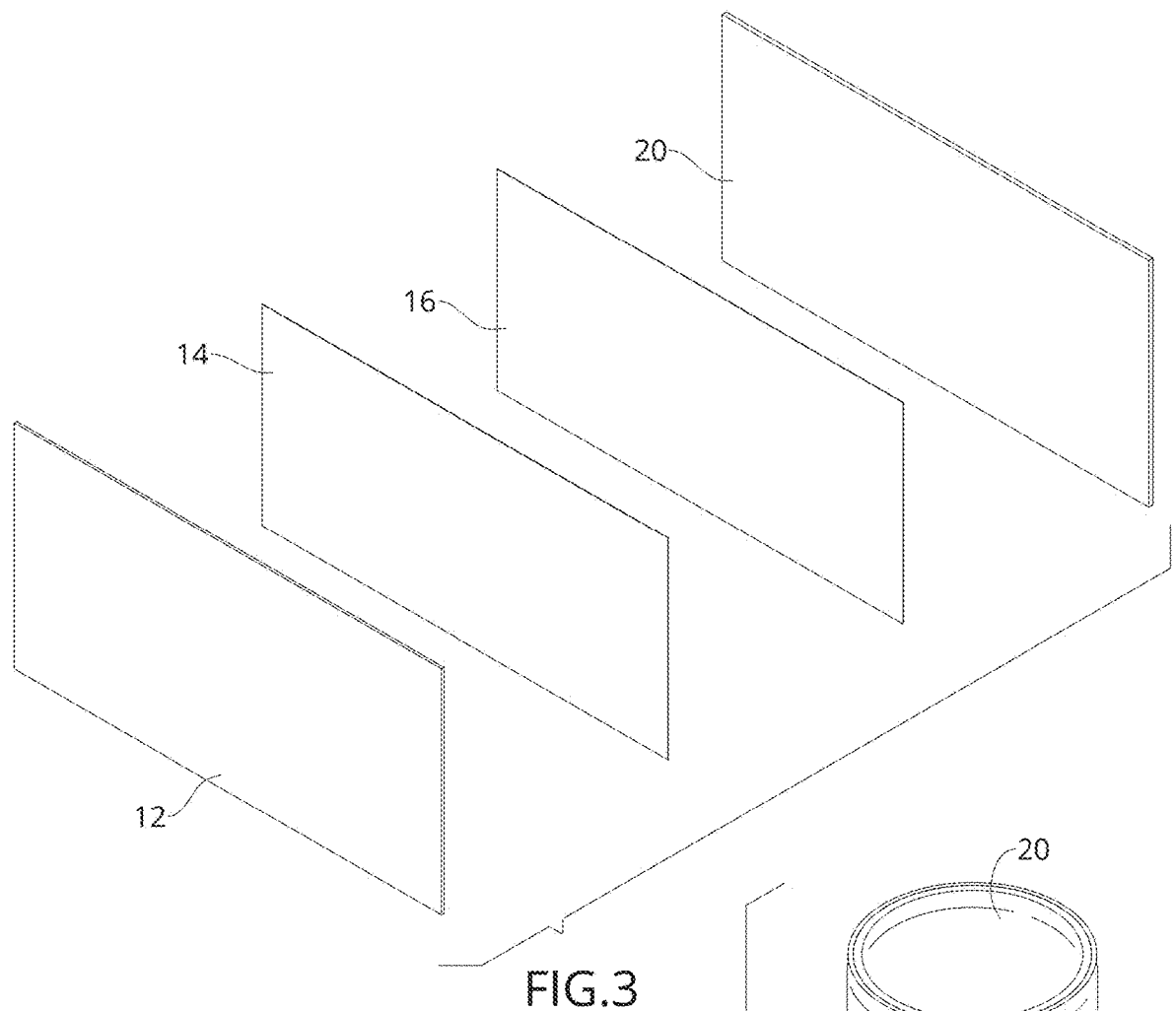
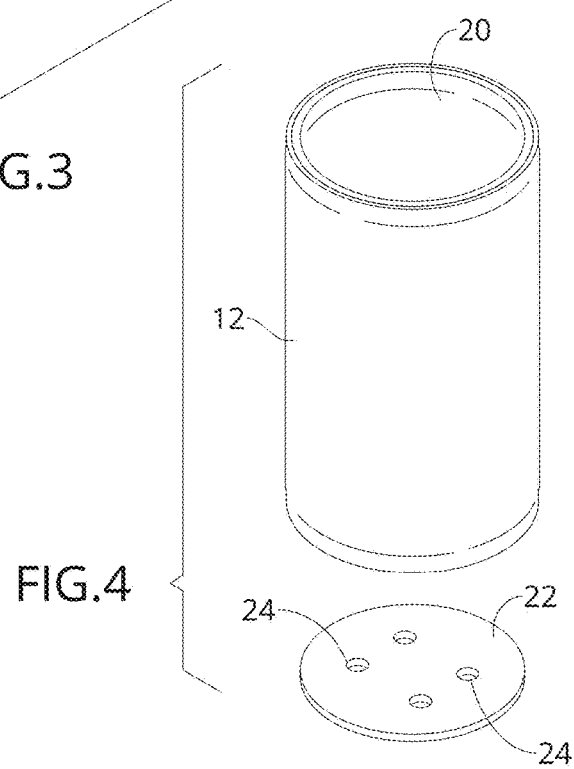

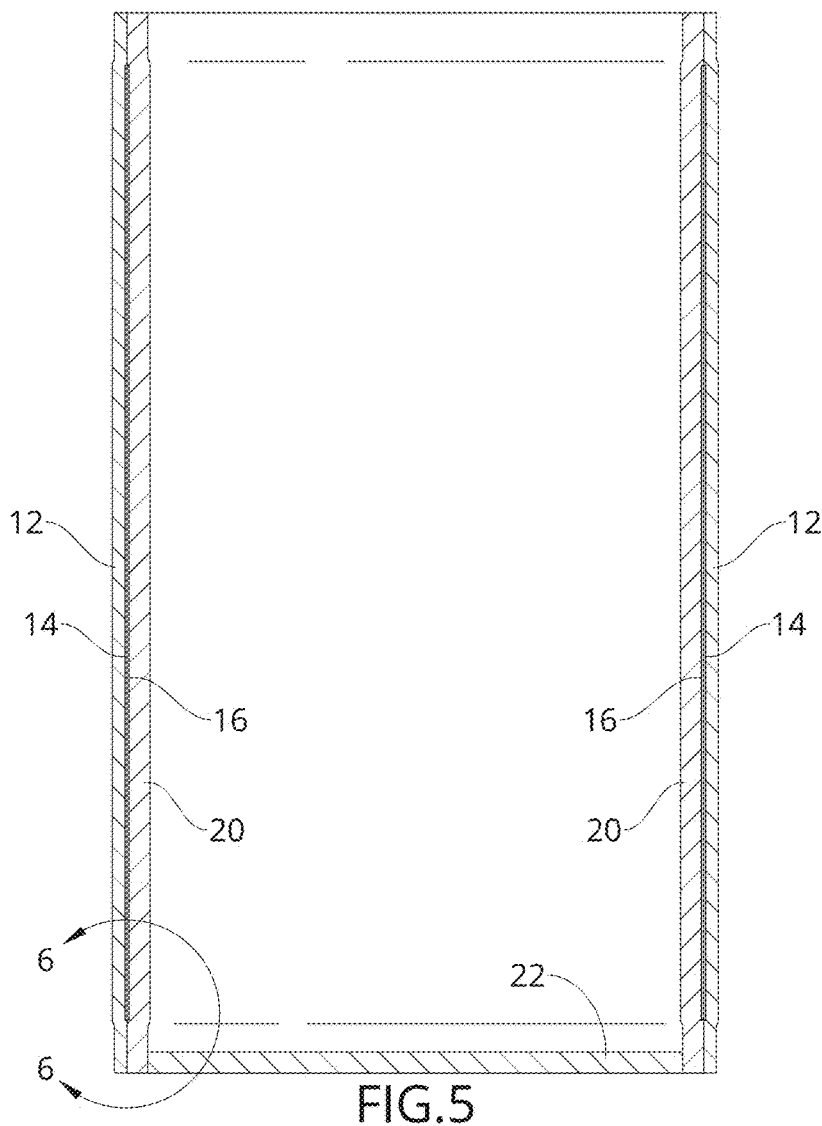
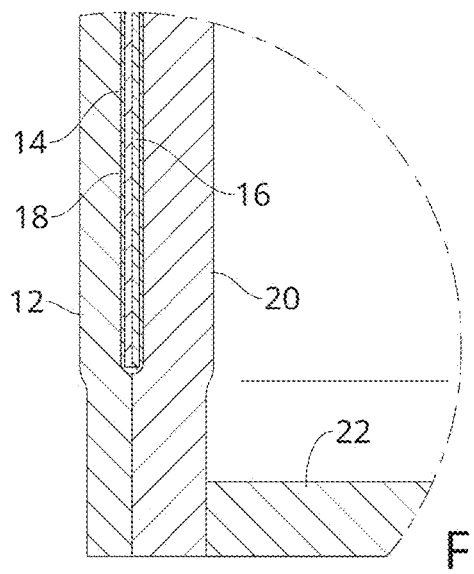
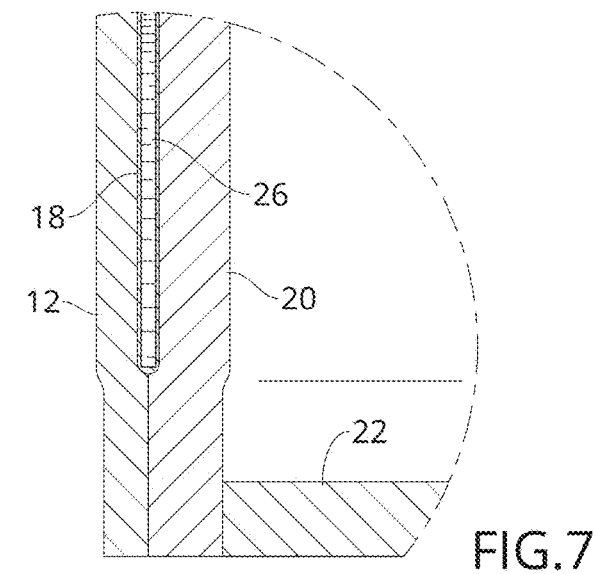

THERMAL BEVERAGE SLEEVE

CROSS-REFERENCE TO RELATED APPLICATION

This application claims the benefit of priority of U.S. provisional application No. 63/598,254, filed Nov. 13, 2023, the contents of which are herein incorporated by reference.

BACKGROUND OF THE INVENTION

The present invention relates to insulating devices and, more particularly, to a thermal beverage sleeve.

During hot days, a cold beverage is often the drink of choice for refreshment and cooling off. However, if not drunk quickly, the cold beverage may soon become warm or even hot due to high air temperatures or the heat transfer from a respective drinker's hands. The short time frame for the beverage being cold and refreshing has led to conventional solutions where a foam insulation is formed to wrap around a drink, e.g., koozies, particularly for canned or bottled drinks. However, these solutions provide minimal insulation and provide no mechanism by which to actively chill a beverage. As a result, drinks insulated by conventional solutions remain cold for only a short time longer than when held in bare hands. Further, conventional solutions are generally only useful for surrounding a single drink and lack versatility for use in other endeavors. Additionally, conventional beverage insulators typically lack customizability and are inconveniently packaged.

As can be seen, there is a need for a thermal beverage sleeve that fits standard canned and bottled drinks while also maintaining the cool temperature of a drink for extended periods of time, and that can be used for more than just keeping a drink cool.

The present invention solves these and other problems with conventional devices by providing a thermal beverage sleeve with interior liners housing a chemical mixture that, when activated, provide a chilling effect to any beverage inserted within the liner. The present invention is thus able to maintain a cold temperature of a beverage for significantly longer periods of time than conventional drink insulators. Further, the chilling effect created by the present invention ensures that the present invention is useful for activities where a cooling effect is required. Additionally, the present invention provides consumers with increased customizability in a convenient package.

SUMMARY OF THE INVENTION

In one aspect of the present invention, there is disclosed a thermal beverage sleeve for keeping beverages cold or providing a chill to beverages. The thermal beverage sleeve comprises a substantially cylindrical main body having open first and second ends with a central opening passing therebetween, and a substantially circular bottom configured to be slidably received and held within the first end.

In another aspect of the present invention, the cylindrical main body comprises an outer layer, a first pouch, a second pouch, and an inner layer. The outer layer forms the exterior surface of the cylindrical main body, the inner layer forms the interior surface and central opening of the cylindrical main body, and the first and second pouches are sandwiched between the outer layer and inner layer. In some embodiments, the outer layer may be formed to be thicker than the inner layer. In further embodiments, the first and second pouches may be encased together in a watertight lining, such that the first and second pouches may be split open without damaging the watertight lining and thereby allow the contents of the first and second pouches to mix. In preferred embodiments, at least one of the first and second pouches contains water, with the other of the first and second pouches containing a chemical compound that undergoes an endothermic chemical reaction when mixed with water.

These and other features, aspects and advantages of the present invention will become better understood with reference to the following drawings, description and claims.

BRIEF DESCRIPTION OF THE DRAWINGS

FIG. 3 is an exploded view of certain layers of a thermal beverage cooler in accordance with a preferred embodiment of the present invention;

FIG. 4 is an exploded view of a thermal beverage cooler of FIG. 2 showing the bottom as a separate component;

FIG. 5 is a section view taken along line 5-5 in FIG. 1;

FIG. 6 is a detail section view of a lower corner portion of the thermal beverage cooler of FIG. 5;

FIG. 7 is a detailed section view of the invention after pouches 14 and 16 have been broken to form mixture 26 within pouch 18 to activate cooling;

DETAILED DESCRIPTION OF THE INVENTION

Figure 1:
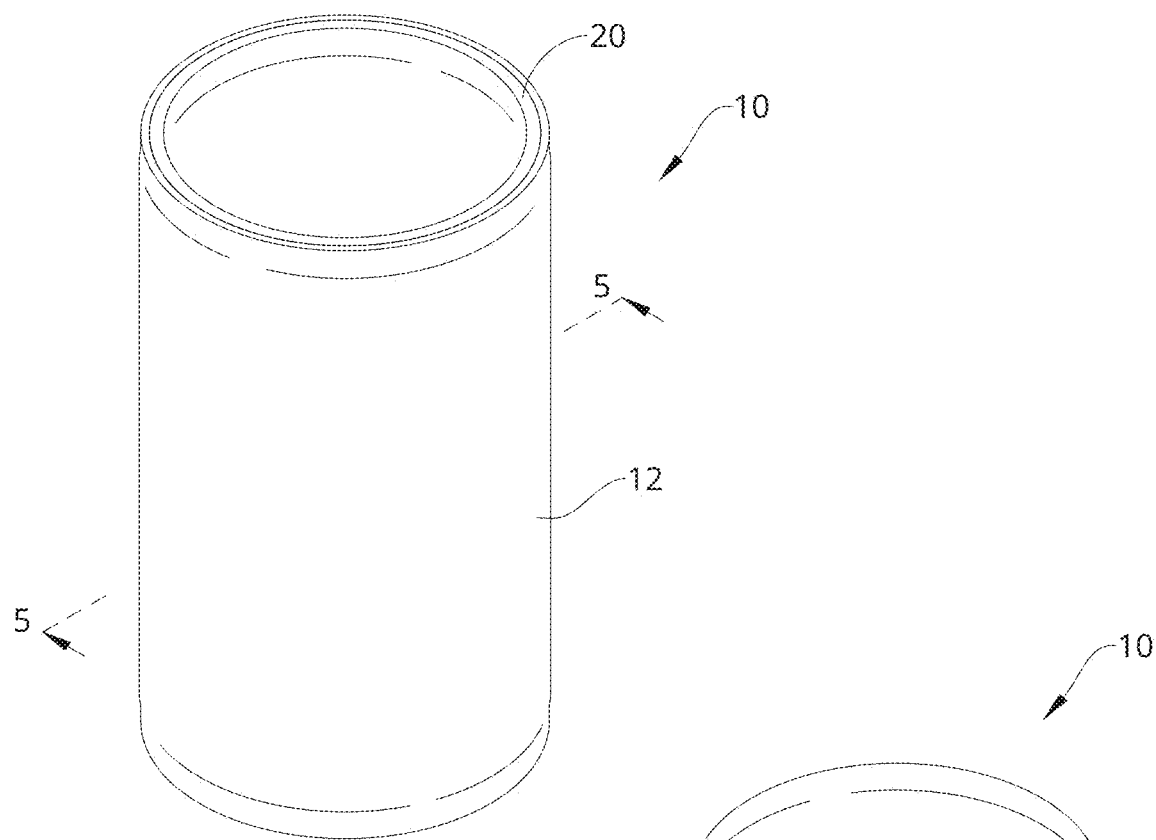
FIG. 1 is a perspective view of a thermal beverage cooler in accordance with a preferred embodiment of the present invention.
Figure 2:
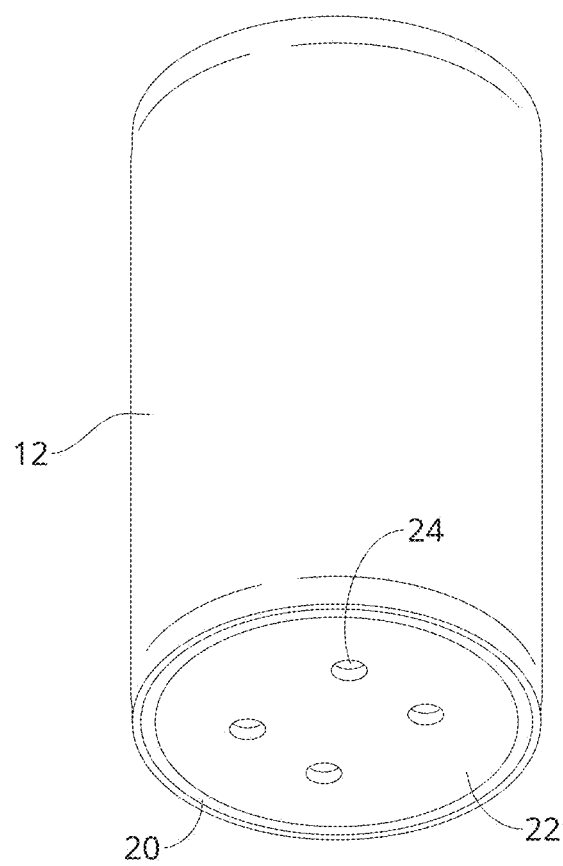
FIG. 2 is a bottom perspective view of the thermal beverage cooler of FIG. 1.

The following is a detailed description of the best currently contemplated modes of carrying out exemplary embodiments of the present invention. The description is not to be taken in a limiting sense but is made merely for the purpose of illustrating the general principles of the invention, since the scope of the invention is best defined by the appended claims.

Broadly, an embodiment of the present invention provides a thermal beverage sleeve for keeping beverages cold or providing a chill to beverages. The thermal beverage sleeve comprises a substantially cylindrical main body having open first and second ends with a central opening passing therebetween. The thermal beverage sleeve further comprises a substantially circular bottom configured to be slidably received and held within the first end, with the circular bottom having a diameter substantially equal to the diameter of the central opening. The circular bottom may include at least one hole formed within to allow air to pass through the circular bottom between the central opening and an exterior of the thermal beverage sleeve.

Further, the cylindrical main body comprises an outer layer, a first pouch, a second pouch, and an inner layer. The outer layer forms the exterior surface of the cylindrical main body, the inner layer forms the interior surface and central opening of the cylindrical main body, and the first and second pouches are sandwiched between the outer layer and inner layer. In some embodiments, the outer layer may be formed to be thicker than the inner layer. In further embodiments, the first and second pouches may be encased together in a watertight lining, such that the first and second pouches may be split open without damaging the watertight lining and thereby allow the contents of the first and second pouches to mix. In preferred embodiments, at least one of the first and second pouches contains water, with the other of the first and second pouches containing a chemical compound that undergoes an endothermic chemical reaction when mixed with water.

The present invention is thus able to maintain a cold temperature of a beverage for significantly longer periods of time than conventional drink insulators. Further, the chilling effect created by the present invention ensures that the present invention is useful for activities where a cooling effect is required.

It should be noted that the materials of manufacture for the present invention are not particularly limited. For example, the outer and inner layers may be formed of a neoprene, rubber, foam, or other similarly durable, flexible and water-resistant material. It should also be noted that the method of manufacture for the present invention is not particularly limited. For example, the outer and inner layers may be formed via cutting, molding, sewing, or other known techniques.

Referring now to FIGS. 1-7, a thermal beverage sleeve 10 in accordance with a preferred embodiment of the present invention is shown. The thermal beverage sleeve 10 comprises a substantially cylindrical main body having open first and second ends with a central opening passing therebetween. The cylindrical main body 10 is formed to be able to receive a variety of bottle and can sizes. For example, the cylindrical main body may be about 5 inches in height, 4.5 mm thick, and have an interior diameter of 2.5 inches forming the central opening. Other dimensions are expressly contemplated without departing from the spirit of the invention.

As seen in FIGS. 1-7, the thermal beverage sleeve 10 further comprises a substantially circular bottom 22 configured to be slidably received and held within the first end, with circular bottom 22 having a diameter substantially equal to the diameter of the central opening. For example, in a preferred embodiment the circular bottom 22 and central opening may have a diameter of about 2.5 inches. Further, the circular bottom 22 may have a substantially similar thickness to the outer layer 12. For example, the circular bottom 22 may have a thickness of about 2.5 mm. The circular bottom 22 may include at least one hole 24 formed within to allow air to pass through the circular bottom 22 between the central opening and an exterior of the thermal beverage sleeve. For example, in a preferred embodiment the circular bottom 22 may include four holes 24, with each of the four holes being ¼ inch in diameter. The holes may be arranged in a symmetrical or asymmetrical pattern about the center of the circular bottom 22. In some embodiments, the circular bottom 22 is securely coupled to the cylindrical main body within the first end, e.g., via sewing, adhesives, or other known coupling means.

As seen by way of example in FIG. 3, the cylindrical main body further comprises an outer layer 12, a first inner cooling pouch 14, a second inner cooling pouch 16, and an inner layer 20. The outer layer 12 forms the exterior surface of the cylindrical main body, the inner layer 20 forms the interior surface and central opening of the cylindrical main body, and the first and second pouches 14 and 16 are sandwiched between the outer layer 12 and inner layer 20. In some embodiments, the outer layer may be formed to be thicker than the inner layer. For example, the outer layer 12 may be about 2.5 mm in thickness, while the inner layer may be about 1.5 mm in thickness. Further, in some embodiments the outer and inner layers are formed from flexible watertight materials, such as neoprene rubber.

The first and second pouches 14 and 16 are formed to be thin breakable pouches that are sealed within the gap between the outer and inner layers 12 and 20. For example, the gap between the outer and inner layers 12 and 20 may be 0.5 mm thick, with the first and second pouches 14 and 16 each being about 0.25 mm thick, and each of the first and second pouches 14 and 16 being formed from thin breakable plastic sheeting.

In a preferred embodiment, the first and second pouches 14 and 16 may be encased together in a watertight pouch 18 to avoid leakage of the first and second pouches 14 and 16 contents outside of the outer and inner layers 12 and 20. The watertight pouch 18 is configured to enable the first and second pouches to rupture without damaging the watertight pouch 18 and allow the contents of the first and second pouches 14 and 16 to mix within the watertight pouch 18 (see activated cooling mixture 26 in FIG. 7). In some embodiments, the watertight pouch 18 may be formed by the outer and inner layers 12 and 20. In preferred embodiments, at least one of the first and second pouches 14 or 16 contains water, with the other of the first and second pouches 14 or 16 containing a chemical compound that undergoes an endothermic chemical reaction when mixed with water. Exemplary chemical compounds suitable for use in the present invention include, but are not limited to, ammonium nitrate, calcium nitrate, or urea. The endothermic reaction of such compounds is strong enough to quickly absorb heat from their surroundings, thereby generating a cooling effect. This cooling effect allows the present invention to chill and keep cold any beverage inserted into the thermal beverage sleeve.

In operation, the thermal beverage sleeve 10 is provided to users in a room temperature state with the first and second pouches 14 and 16 sealed and unbroken within the watertight pouch 18 formed by the outer and inner layers 12 and 20. When a user desires to use the thermal beverage sleeve to hold and cool a beverage, the user may lightly shake the thermal beverage sleeve to distribute the contents of the first and second pouches 14 and 16 and prepare the contents of the first and second pouches for activation. The user may then smack, slap, punch, or otherwise break open the first and second pouches 14 and 16 without damaging the outer and inner layers 12 and 20. The user may then shake the thermal beverage sleeve for a limited time, e.g., 10 seconds, to fully mix the contents of the first and second pouches 14 and 16. The contents of the first and second pouches 14 and 16, e.g., water and ammonium nitrate, produce an endothermic reaction upon mixing, causing the thermal beverage sleeve to become cold. The thinner inner layer 20 then allows for the cold of the endothermic reaction to draw heat from any beverage held within the central opening of the thermal beverage sleeve, thus chilling the beverage and maintaining a cool beverage temperature for extended periods of time.

In some embodiments, after initial use of the thermal beverage sleeve, the thermal beverage sleeve 10 may be placed in a freezer, cooler, or other chilled container to allow the mixture of the contents of the first and second pouches 14 and 16 to be chilled. This re-chilling of the thermal beverage sleeve allows the present invention to repeatedly provide a chilling effect to any beverage placed inside the thermal beverage sleeve. The present invention thus may be reused to chill beverages as frequently as a user may desire.

Referring now to FIGS. 8-11, a thermal beverage sleeve 30 in accordance with an alternative preferred embodiment of the present invention is shown. The thermal beverage sleeve 30 comprises a substantially cylindrical main body having open first and second ends with a central opening passing therebetween. The cylindrical main body 30 is formed to be able to receive a variety of bottles and can sizes. For example, the cylindrical main body may be about 5 inches in height, 4.5 mm thick, and have an interior diameter of 2.5 inches forming the central opening. Other dimensions are expressly contemplated without departing from the spirit of the invention.

As seen in FIGS. 8-11, the thermal beverage sleeve 30 further comprises a substantially circular bottom 38 configured to be slidably received and held within the first end, with circular bottom 38 having a diameter substantially equal to the diameter of the central opening. For example, in a preferred embodiment the circular bottom 38 and central opening may have a diameter of about 2.5 inches. Further, the circular bottom 38 may have a substantially similar thickness to the outer layer 32 or inner layer 20 (see FIG. 10 by way of example). For example, the circular bottom 38 may have a thickness of about 2.5 mm. The circular bottom 38 may include at least one hole 40 formed within to allow air to pass through the circular bottom 38 between the central opening and an exterior of the thermal beverage sleeve. In a preferred embodiment hole 40 may be ¼ inch in diameter. In some embodiments, the circular bottom 38 is securely coupled to the cylindrical main body within the first end, e.g., via sewing, adhesives, or other known coupling means.

Figure 10:
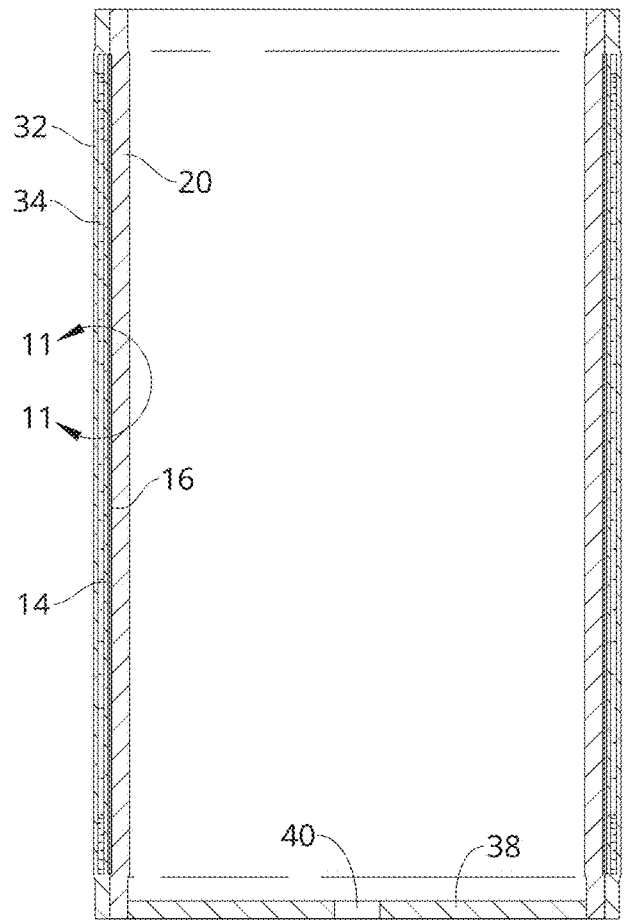
FIG. 10 is a section view of the thermal beverage cooler taken along line 10-10 in FIG. 8.
Figure 11:
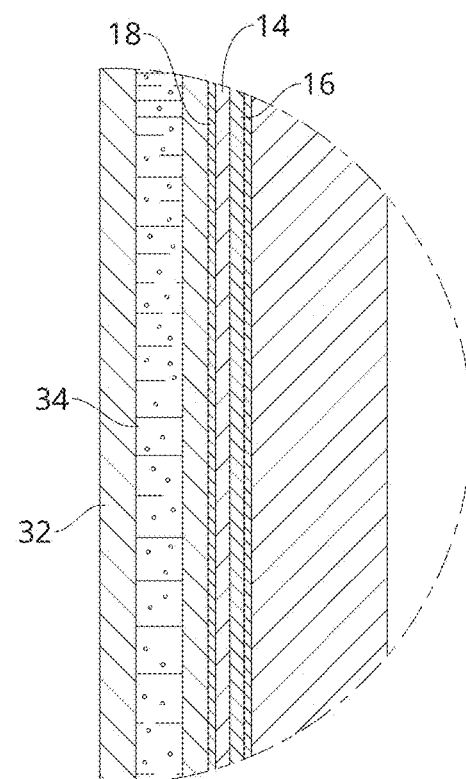
FIG. 11 is a detailed section view of a portion of the thermal beverage cooler of FIG. 10.

As seen by way of example in FIGS. 10 and 11, the cylindrical main body may comprise an outer layer 32, a first inner cooling pouch 14, a second inner cooling pouch 16, and an inner layer 20. The outer layer 32 forms the exterior surface of the cylindrical main body, the inner layer 20 forms the interior surface and central opening of the cylindrical main body, and the first and second pouches 14 and 16 are sandwiched between the outer layer 32 and inner layer 20. In some embodiments, the outer layer may be formed to be thicker or thinner than the inner layer. For example, the outer layer 32 may be about 2.5 mm in thickness, while the inner layer 20 may be about 1.5 mm in thickness, or vice versa. Further, in some embodiments the outer and inner layers are formed from flexible watertight materials, such as neoprene rubber.

The first and second pouches 14 and 16 are formed to be thin breakable pouches that are sealed within the gap between the outer and inner layers 32 and 20. For example, the gap between the outer and inner layers may be 0.5 mm thick, with the first and second pouches 14 and 16 each being about 0.25 mm thick, and each of the first and second pouches 14 and 16 being formed from thin breakable plastic sheeting.

In a preferred embodiment, the first and second pouches 14 and 16 may be encased together in a watertight pouch 18 to avoid leakage of the first and second pouches 14 and 16 contents outside of the outer and inner layers 32 and 20. The watertight pouch 18 is configured to enable the first and second pouches to rupture without damaging the watertight pouch 18 and allow the contents of the first and second pouches 14 and 16 to mix within the watertight pouch 18. In some embodiments, the watertight pouch 18 may be formed by the outer and inner layers 32 and 20. In preferred embodiments, at least one of the first and second pouches 14 or 16 contains water, with the other of the first and second pouches 14 or 16 containing a chemical compound that undergoes an endothermic chemical reaction when mixed with water. Exemplary chemical compounds suitable for use in the present invention include, but are not limited to, ammonium nitrate, calcium nitrate, or urea. The endothermic reaction of such compounds is strong enough to quickly absorb heat from their surroundings, thereby generating a cooling effect. This cooling effect allows the present invention to chill and keep cold any beverage inserted into the thermal beverage sleeve.

In a preferred embodiment, as seen in FIGS. 10 and 11, the thermal beverage sleeve 30 further comprises an air chamber layer 34 between the outer layer 32 and the inner layer 20. In a preferred embodiment, air chamber layer 34 is positioned between the outer layer 32 and the watertight pouch 18.

Figure 8:
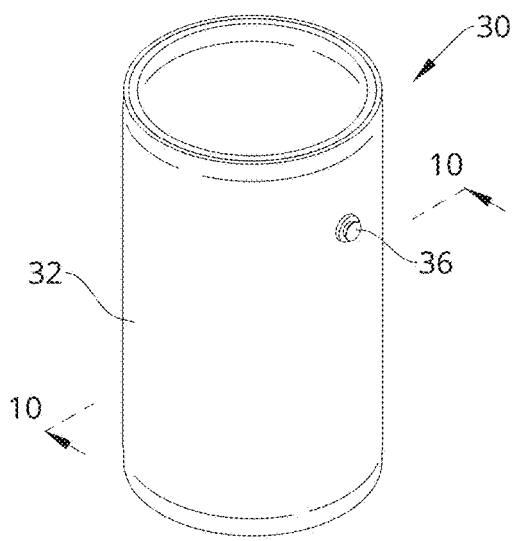
FIG. 8 is a top perspective view of a thermal beverage cooler in accordance with an alternate preferred embodiment of the present invention.
Figure 9:
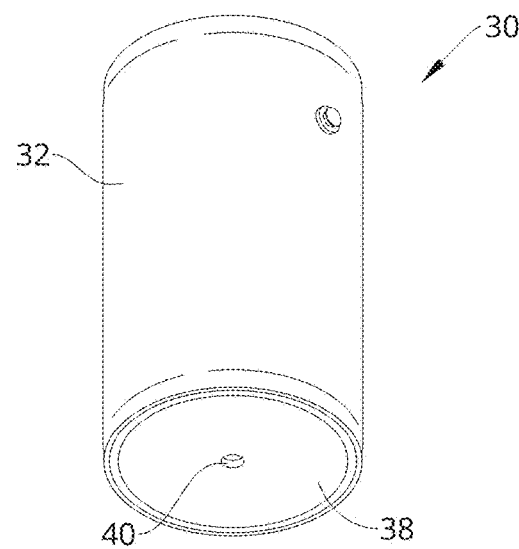
FIG. 9 is a bottom perspective view of the thermal beverage cooler of FIG. 8.

In addition, as seen in FIGS. 8 and 9, in this alternative embodiment the thermal beverage sleeve 30 further comprises a valve/pump 36 positioned within the cylindrical main body. Valve/pump 36 may be used to introduce and/or release air into the interior of the cylindrical main body.

Similar to the earlier embodiment discussed above, in this alternative preferred embodiment, first and second pouches 14 and 16 may be encased together in a watertight pouch 18 to avoid leakage of the first and second pouches 14 and 16 contents outside of the outer and inner layers 32 and 20. The watertight pouch 18 is configured to enable the first and second pouches to rupture without damaging the watertight pouch 18 and allow the contents of the first and second pouches 14 and 16 to mix within the watertight pouch 18 (in a similar fashion as to what is depicted as activated cooling mixture 26 in FIG. 7). In some embodiments, the watertight pouch 18 may be formed by the outer and inner layers 32 and 20. In preferred embodiments, at least one of the first and second pouches 14 or 16 contains water, with the other of the first and second pouches 14 or 16 containing a chemical compound that undergoes an endothermic chemical reaction when mixed with water. Exemplary chemical compounds suitable for use in the present invention include, but are not limited to, ammonium nitrate, calcium nitrate, or urea. The endothermic reaction of such compounds is strong enough to quickly absorb heat from their surroundings, thereby generating a cooling effect. This cooling effect allows the present invention to chill and keep cold any beverage inserted into the thermal beverage sleeve.

In operation, the thermal beverage sleeve 30 is provided to users in a room temperature state with the first and second pouches 14 and 16 sealed and unbroken within the watertight pouch 18. When a user desires to use the thermal beverage sleeve to hold and cool a beverage, the user may lightly shake the thermal beverage sleeve to distribute the contents of the first and second pouches 14 and 16 and prepare the contents of the first and second pouches for activation. The user may then smack, slap, punch, or otherwise break open the first and second pouches 14 and 16 without damaging the outer and inner layers 32 and 20. The user may then shake the thermal beverage sleeve for a limited time, e.g., 10 seconds, to fully mix the contents of the first and second pouches 14 and 16. The contents of the first and second pouches 14 and 16, e.g., water and ammonium nitrate, produce an endothermic reaction upon mixing, causing the thermal beverage sleeve to become cold. The thinner inner layer 20 then allows for the cold of the endothermic reaction to draw heat from any beverage held within the central opening of the thermal beverage sleeve, thus chilling the beverage and maintaining a cool beverage temperature for extended periods of time.

In some embodiments, after initial use of the thermal beverage sleeve, the thermal beverage sleeve 30 may be placed in a freezer, cooler, or other chilled container to allow the mixture of the contents of the first and second pouches 14 and 16 to be chilled. This re-chilling of the thermal beverage sleeve allows the present invention to repeatedly provide a chilling effect to any beverage placed inside the thermal beverage sleeve. The present invention thus may be reused to chill beverages as frequently as a user may desire.

The present invention is thus able to maintain a cold temperature of a beverage for significantly longer periods of time than conventional drink insulators, with experimentation showing an up to four times increase in the amount of time drinks are kept at low temperatures. Further, the chilling effect created by the present invention ensures that the present invention is useful for activities where a cooling effect is required. For example, the present invention may be suitable for use in first aid or to chill items when refrigeration is unavailable, such as when participating in outdoor activities. Additionally, the present invention provides consumers with increased customizability in a convenient package. The present invention may be configured for disposable single use or to be reused multiple times depending on the desires of a respective user.

It should be understood, of course, that the foregoing relates to exemplary embodiments of the invention and that modifications may be made without departing from the spirit and scope of the invention as set forth in the following claims.

What is claimed is:

1. A thermal beverage sleeve for chilling or maintaining a cool temperature for beverages, the sleeve comprising;
   a substantially cylindrical main body having an open first and an open second end, with a central opening therebetween;
   a substantially circular bottom configured to be slidably received and held within the first end, with circular bottom having a diameter substantially equal to the diameter of the central opening;
   the cylindrical main body comprising an outer layer, a first inner breakable cooling pouch, a second inner breakable cooling pouch, and an inner layer;
   wherein the outer layer forms the exterior surface of the cylindrical main body, the inner layer forms the interior surface and central opening of the cylindrical main body, and the first and second pouches are positioned between the outer layer and inner layer;
   wherein the first and second pouches are positioned within a watertight pouch configured to enable the first and second pouches to rupture without damaging the watertight pouch and allowing the contents of the first and second pouches to mix within the watertight pouch;
   wherein the first pouch contains water and the second pouch contains a chemical compound that undergoes an endothermic chemical reaction when mixed with water.

2. The thermal beverage sleeve of claim 1, wherein the second pouch contains ammonium nitrate, calcium nitrate, or urea.

3. The thermal beverage sleeve of claim 1, further comprising an air chamber layer between the outer layer and the inner layer.

4. The thermal beverage sleeve of claim 1, further comprising an air valve in the cylindrical main body.

5. The thermal beverage sleeve of claim 1, wherein the cylindrical main body is formed to be able to receive a variety of bottle and can sizes.

6. The thermal beverage sleeve of claim 1, wherein the cylindrical main body is about 5 inches in height, about 4.5 mm thick, and has an interior diameter of about 2.5 inches forming the central opening.

7. The thermal beverage sleeve of claim 1, wherein the circular bottom and central opening have a diameter of about 2.5 inches.

8. The thermal beverage sleeve of claim 1, wherein the circular bottom has a substantially similar thickness to the outer layer.

9. The thermal beverage sleeve of claim 1, wherein the circular bottom has a thickness of about 2.5 mm.

10. The thermal beverage sleeve of claim 1, wherein the circular bottom has at least one hole formed within to allow air to pass through the circular bottom between the central opening and an exterior of the thermal beverage sleeve.

11. The thermal beverage sleeve of claim 1, wherein the outer layer is about 2.5 mm in thickness, and the inner layer is about 1.5 mm in thickness.

12. The thermal beverage sleeve of claim 1, wherein the outer and inner layers are formed from flexible watertight materials, such as neoprene rubber.

* * * * *